United States Patent
Ishii

(10) Patent No.: US 10,935,878 B2
(45) Date of Patent: Mar. 2, 2021

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Masatoshi Ishii, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 16/277,910

(22) Filed: Feb. 15, 2019

(65) Prior Publication Data

US 2019/0258149 A1   Aug. 22, 2019

(30) Foreign Application Priority Data

Feb. 20, 2018 (JP) ............................. JP2018-028178
Dec. 20, 2018 (JP) ............................. JP2018-237897

(51) Int. Cl.
- *G03B 21/20* (2006.01)
- *G06T 3/00* (2006.01)
- *G03B 21/14* (2006.01)

(52) U.S. Cl.
CPC ....... *G03B 21/2046* (2013.01); *G03B 21/145* (2013.01); *G03B 21/147* (2013.01); *G06T 3/005* (2013.01)

(58) Field of Classification Search
CPC .... G03B 21/14; G03B 21/147; G03B 21/145; G03B 21/2046; G06F 3/1446; G06F 3/147; H04N 9/3185; G06T 3/005

USPC ........................................................... 353/79
See application file for complete search history.

(56) References Cited

U.S. PATENT DOCUMENTS

| | | | |
|---|---|---|---|
| 9,046,747 B2* | 6/2015 | Furui ...................... G06T 3/005 |
| 2014/0168375 A1* | 6/2014 | Morimura ............ H04N 13/111 |
| | | | 348/46 |
| 2019/0164333 A1* | 5/2019 | Fukushima ............. B60R 1/002 |
| 2019/0260976 A1* | 8/2019 | Ishii ....................... G09G 3/003 |
| 2020/0005738 A1* | 1/2020 | Ishii ....................... G06F 3/012 |
| 2020/0137363 A1* | 4/2020 | Nakada ................. H04N 9/3185 |

FOREIGN PATENT DOCUMENTS

JP    2007318754 A    12/2007

* cited by examiner

*Primary Examiner* — William C. Dowling
(74) *Attorney, Agent, or Firm* — Canon U.S.A., Inc. IP Division

(57) ABSTRACT

An image processing apparatus is configured to generate a display image to be produced on a display system including a display unit. The image processing apparatus includes an acquisition unit configured to acquire orientation information indicating an orientation of an imaging apparatus when the imaging apparatus captures an input image, a setting unit configured to set a projection plane in a virtual space based on the orientation information, and a generation unit configured to generate the display image to be produced on the display unit with use of a relationship between the input image and the projection plane.

20 Claims, 14 Drawing Sheets

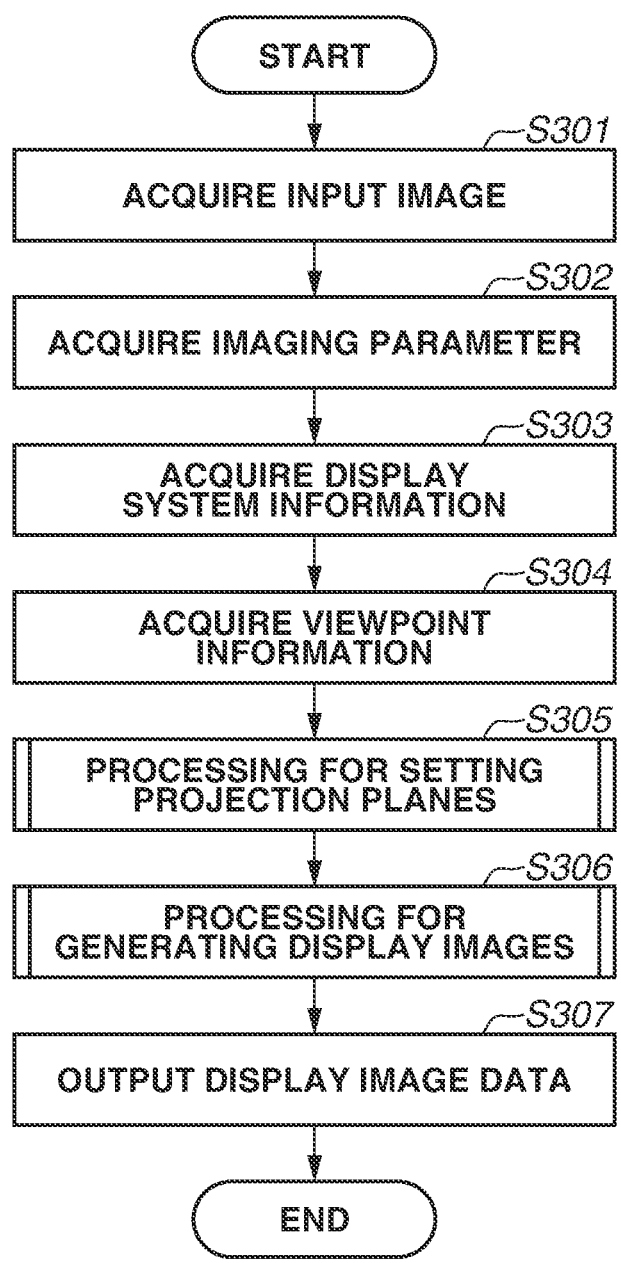

FIG.12A
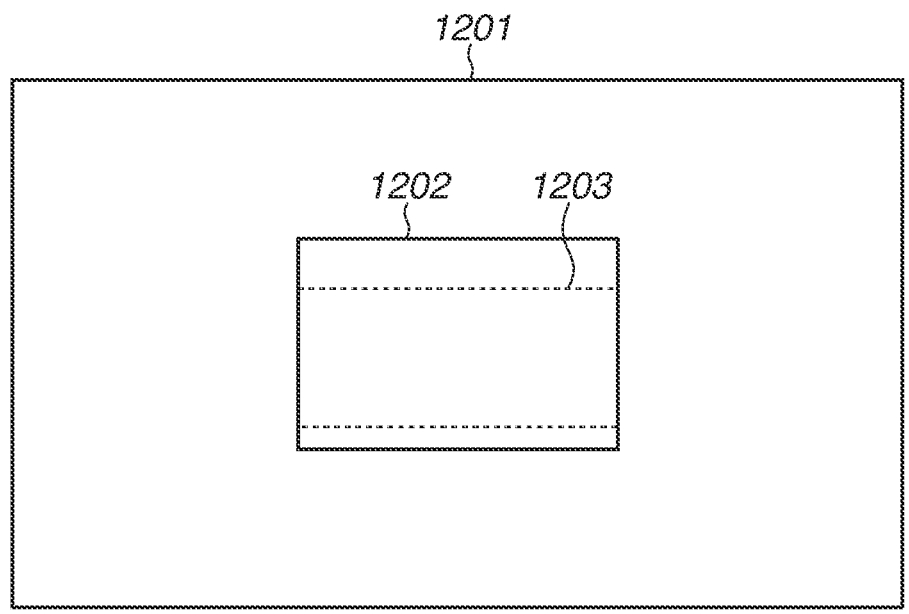
FIG.12B                FIG.12C
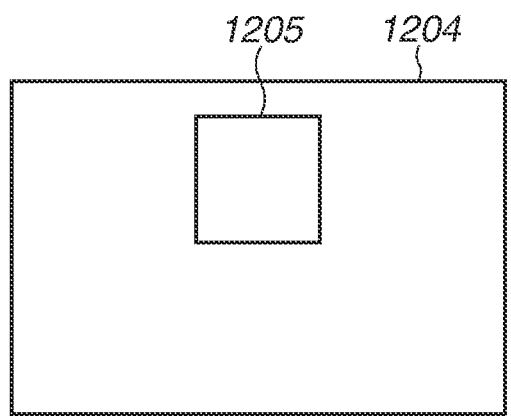 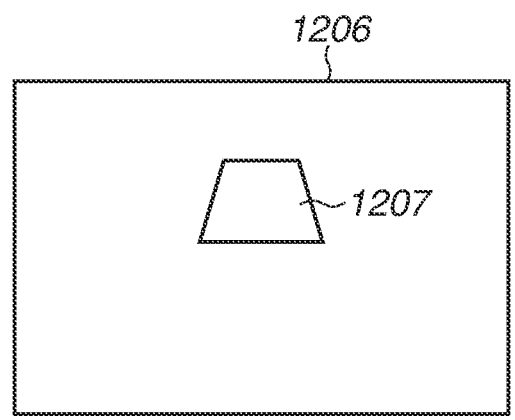

IMAGE PROCESSING APPARATUS, IMAGE PROCESSING METHOD, AND PROGRAM

BACKGROUND

Field of the Disclosure

The present disclosure relates to a technique for generating a display image for a display system that displays an image.

Description of the Related Art

Conventionally, there has been known as one of display systems for displaying images a system configured to provide a highly realistic sensation to an observer by displaying an image on a display screen arranged so as to cover a field of view of the observer. An image acquired by imaging a subject with use of an imaging apparatus is an image projected on a flat surface, and, to display it on a display system supporting a wide field of view, the captured image should be subjected to image processing according to the display system.

Japanese Patent Application Laid-Open No. 2007-318754 discusses a method for displaying an image on a spherical screen at a wide viewing angle that is arranged in such a manner that a concaved surface thereof is oriented toward an observer. According to the method discussed in Japanese Patent Application Laid-Open No. 2007-318754, the image to be displayed on the screen is generated by mapping processing for attaching a planar image onto the spherical shape.

Desirably, an orientation direction of the imaging apparatus when the captured image is acquired coincides with a line-of-sight direction of the observer observing the image displayed on the display system. However, the imaging apparatus does not necessarily capture the image at the time of the imaging considering the line-of-sight direction in the display system. Therefore, for example, according to the method discussed in Japanese Patent Application Laid-Open No. 2007-318754, if an image captured in a horizontal orientation is directly mapped onto the spherical shape, a region corresponding to a ground surface in the captured image is incorrectly displayed on an upper side on the sphere. In this manner, the conventional technique does not generate the display image to be produced on the display system considering the orientation of the imaging apparatus when the captured image has been acquired, thereby it sometimes ends up with generation of an unnatural display image.

SUMMARY

Therefore, the present disclosure is directed to generating a display image without causing much strangeness when generating the display image to be produced on the display system from the input image.

According to an aspect of the present disclosure, an image processing apparatus is configured to generate a display image to be produced on a display system including a display unit. The image processing apparatus includes an acquisition unit configured to acquire information regarding an imaging direction of an imaging apparatus when the imaging apparatus captures an input image, and a generation unit configured to generate the display image to be produced on the display unit with use of a relationship between the input image and a projection plane in a virtual space according to the information regarding the imaging direction.

Further features of the present disclosure will become apparent from the following description of exemplary embodiments with reference to the attached drawings.

BRIEF DESCRIPTION OF THE DRAWINGS

FIG. 3 is a flowchart illustrating a flow of processing performed by the image processing apparatus.

FIGS. 12A, 12B, and 12C illustrate the input image and the display image.

DESCRIPTION OF THE EMBODIMENTS

In the following description, exemplary embodiments of the present disclosure will be described with reference to the drawings. The exemplary embodiments that will be described below are not necessarily intended to limit the present disclosure, and not all of combinations of features that will be described in the present exemplary embodiments are necessarily essential to a solution of the present disclosure.

Figure 4:
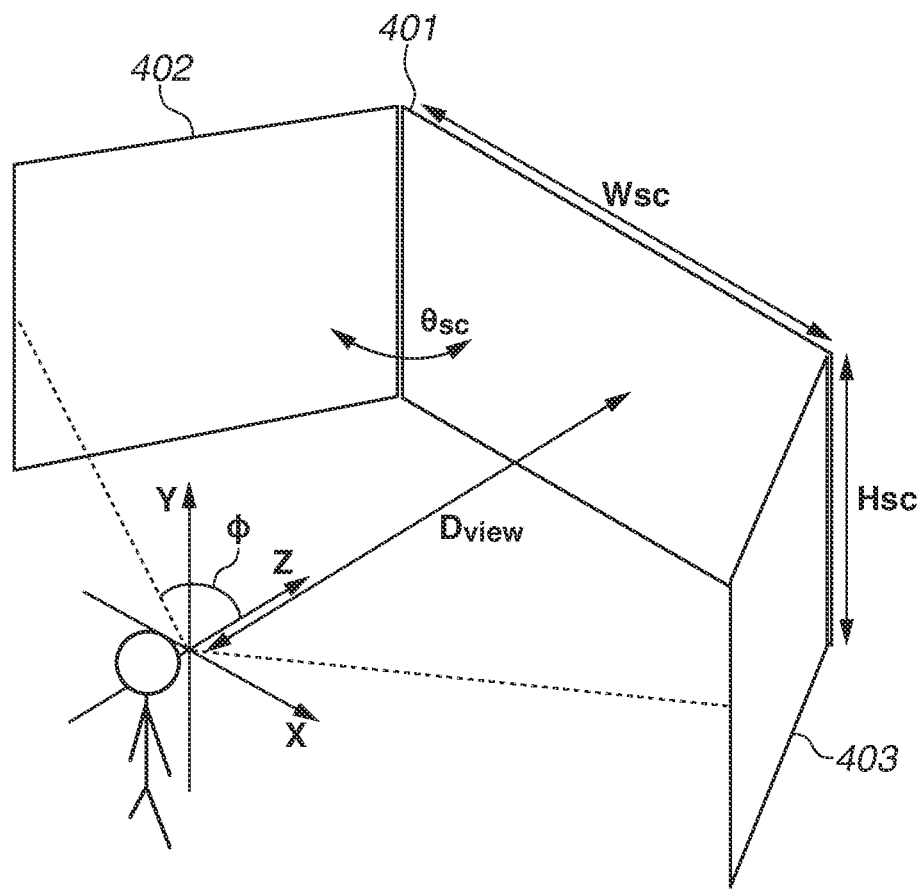
FIG. 4 illustrates an example of a display system.

A first exemplary embodiment will be described based on an image processing apparatus for a display system that displays an image containing a wide field of view by arranging three planar displays capable of displaying images so as to cover a field of view of an observer by way of example. FIG. 4 illustrates an example of the display system assumed to be constructed in the present exemplary embodiment. In the display system according to the present exemplary embodiment, a display unit that displays the image is formed by three displays, namely, a central display 401, a left display 402, and a right display 403. The central display 401, the left display 402, and the right display 403 are arranged so as to draw an isosceles trapezoid when being viewed from above. For example, a self-luminous device, such as a liquid crystal display, is used as each of the displays 401 to 403. The central display 401 is disposed in front of the observer. The left display 402 is disposed so as to contact an end of the central display 401 on a left side as viewed from the observer and have an angle θsc as an angle defined together with the central display 401. Similarly, the right display 403 is disposed so as to contact an end of the central display 401 on a right side as viewed from the observer and have the angle θsc as an angle defined together with the central display 401. Therefore, the three displays 401 to 403 are arranged in such a manner that normal lines from respective display surfaces have an intersection point among them. Then, display images respectively corresponding to them are displayed on intersection point sides of the respective display surfaces. The display unit covers the field of view of the observer by arranging the three planar display screens (displays) in this manner. Displaying the image on this display system can provide a realistic sensation to the observer as if the observer is present at a location where the displayed image is captured. In the present exemplary embodiment, an image processing apparatus that generates the display image to be displayed on the display system illustrated in FIG. 4 will be described.

In the present exemplary embodiment, a term "display angle" will be used to refer to an angle at which the observer views the image displayed on the display unit (the three displays 401 to 403) in the display system. Further, all of the display images displayed on the individual displays 401 to 403 are generated from a common input image. This means that, in the present exemplary embodiment, three display images are generated based on an input image captured with use of one imaging apparatus (for example, a digital camera).

Figure 1:
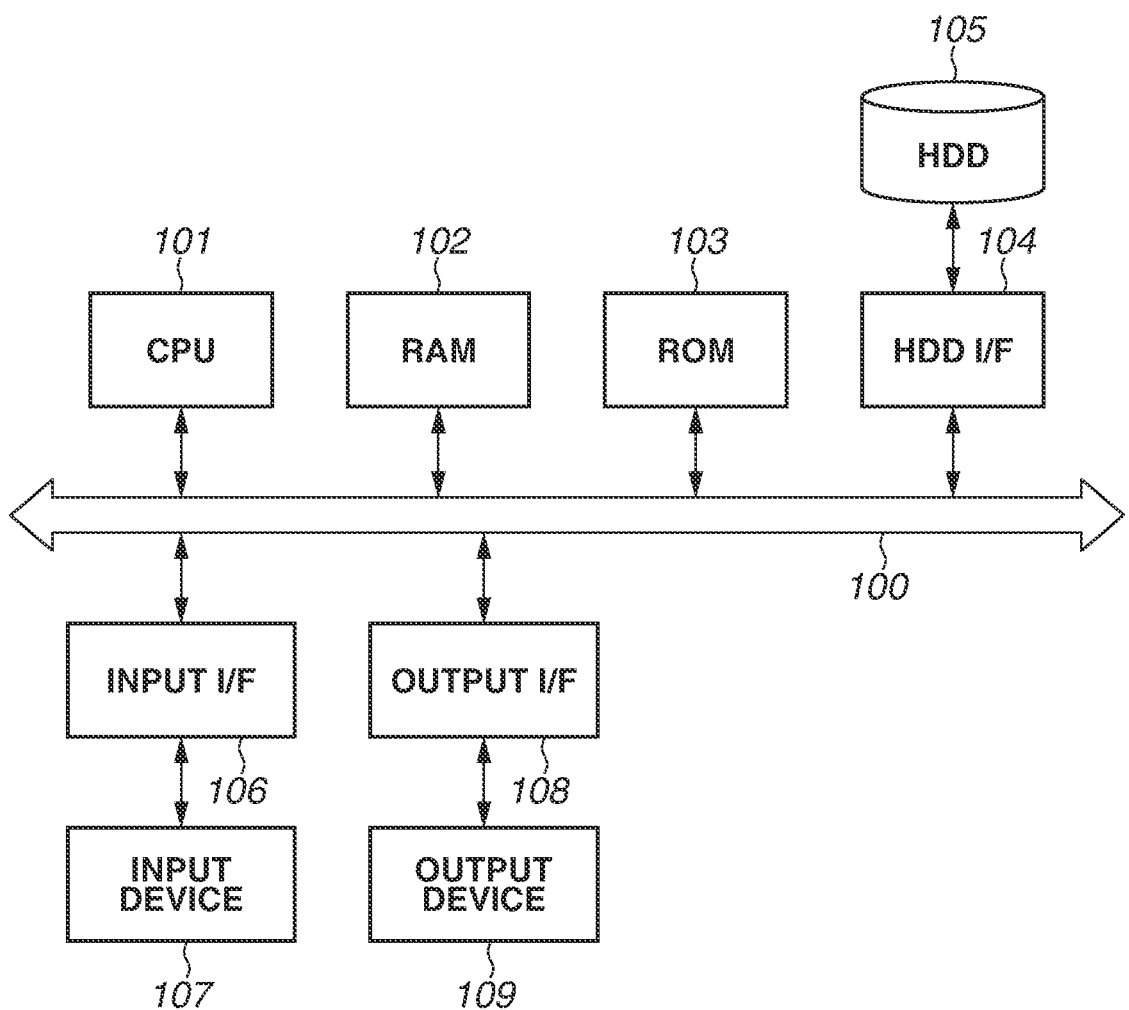
FIG. 1 illustrates a hardware configuration of an image processing apparatus.

FIG. 1 illustrates a hardware configuration of the image processing apparatus according to the present exemplary embodiment. A central processing unit (CPU) 101 executes programs stored in a read only memory (ROM) 103 and a hard disk drive (HDD) 105 with use of a random access memory (RAM) 102 as a work memory, thereby controlling each unit that will be described below via a system bus 100. By this control, various processing procedures that will be described below are performed. An HDD interface (I/F) 104 is an interface such as Serial Advanced Technology Attachment (SATA), and connects a secondary storage device, such as the HDD 105 and an optical disk drive. The CPU 101 can read out data from the HDD 105 and write data into the HDD 105 via the HDD I/F 104. Further, the CPU 101 can develop the data stored in the HDD 105 into the RAM 102, and also store the data developed in the RAM 102 into the HDD 105. Then, the CPU 101 can execute the data developed in the RAM 102 regarding the data as a program. An input I/F 106 is a serial bus interface, such as Universal Serial Bus (USB) and Institute of Electrical and Electronics Engineers (IEEE) 1394, and connects an input device 107, such as a keyboard and a mouse. The CPU 101 can read in data from the input device 107 via the input I/F 106. An output I/F 108 is a video output interface, such as Digital Visual Interface (DVI) and High-Definition Multimedia Interface (HDMI) (registered trademark), and connects an output device 109, such as a liquid crystal display and a projector. The CPU 101 can transmit data to the output device 109 via the output I/F 108, thereby causing the output device 109 to present a display. In the present exemplary embodiment, the output device 109 is the display system including the display unit illustrated in FIG. 4.

Figure 2A:
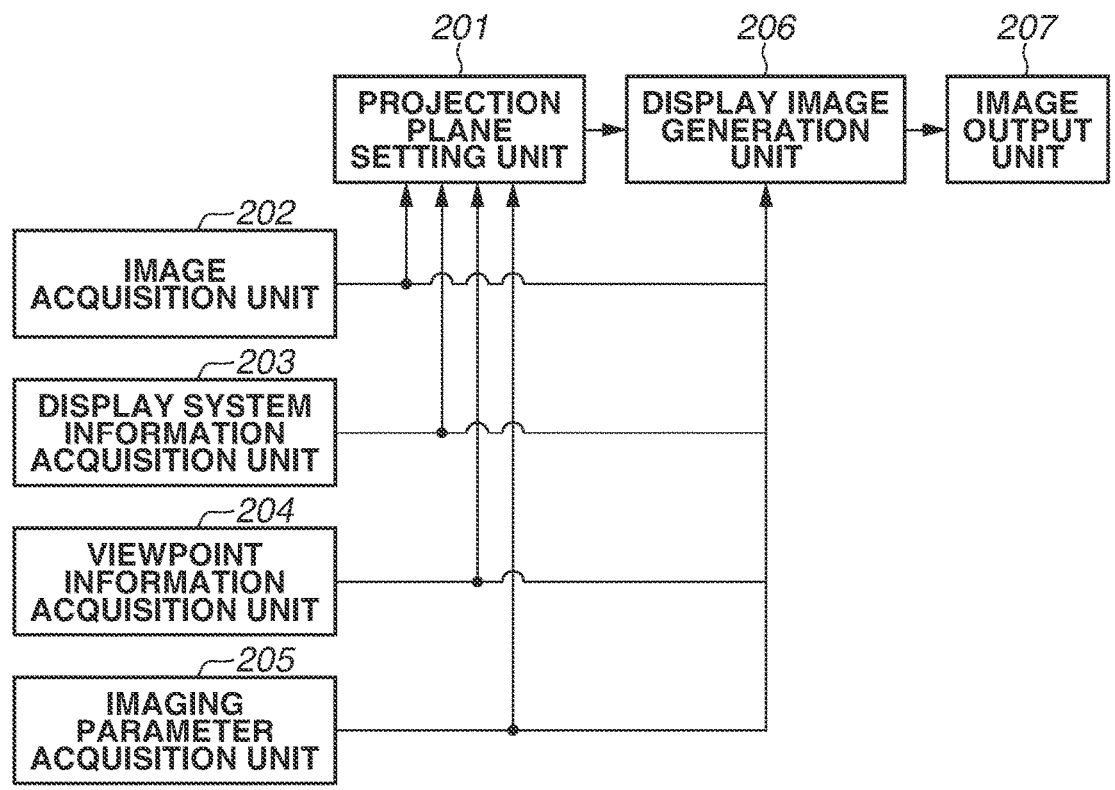
FIG. 2A is a block diagram illustrating a functional configuration of the image processing apparatus.
Figure 2B:
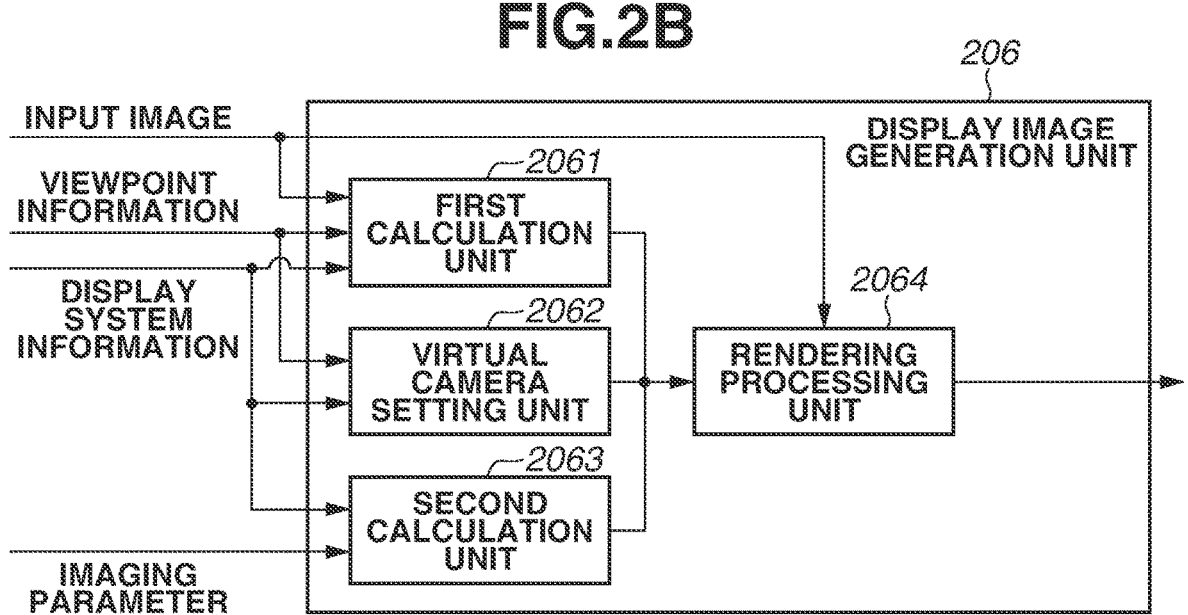
FIG. 2B is a block diagram illustrating a detailed functional configuration of a display image generation unit.

FIGS. 2A and 2B are block diagrams illustrating functional configurations of the image processing apparatus according to the present exemplary embodiment. In FIG. 2A, the image processing apparatus includes a projection plane setting unit 201, an image acquisition unit 202, a display system information acquisition unit 203, a viewpoint information acquisition unit 204, an imaging parameter acquisition unit 205, a display image generation unit 206, and an image output unit 207.

The projection plane setting unit 201 sets two projection planes for generating the display image to be displayed on each of the displays 401 to 403 in the display system from the input image. In the present exemplary embodiment, the three display images are generated from the input image with use of a planar virtual projection plane (hereinafter referred to as a planar projection plane) corresponding to the input image and a cylindrical virtual projection plane (hereinafter referred to as a cylindrical projection plane). Then, the projection plane setting unit 201 sets the planar projection plane and the cylindrical projection plane. The planar projection plane is set according to an aspect ratio of the input image and an angle of view of imaging when the input image acquired by the imaging is captured. The cylindrical projection plane is a projection plane having a shape formed by a free-form surface, and is shaped such that a side surface of a cylinder is partially cut out, in the present example. The cylindrical projection plane can be regarded as a surface defined by horizontally curving a flat surface. The shape of the cylindrical projection plane as viewed from above is an arc drawn with a smooth line segment unlike a cornered shape like the shape drawn by the three displays 401 to 403 in the display system (a part of the isosceles trapezoid). The projection plane setting unit 201 generates the cylindrical projection plane according to a size of each of the displays 401 to 403 and a positional relationship among them in the display system. In the present exemplary embodiment, the projection plane setting unit 201 further disposes the generated cylindrical projection plane in a virtual space according to an orientation of the imaging apparatus when the input image is captured, and a viewpoint position relative to the display system.

The image acquisition unit 202 acquires the image captured by the imaging and outputs the acquired image to the display image generation unit 206 as the input image.

The display system information acquisition unit 203 acquires information regarding the display unit in the display system (the displays 401 to 403 in the present example). In the present exemplary embodiment, assume that the display system information acquisition unit 203 acquires information indicating the number of displays, the shape of each of the display surfaces, the size, and the positional relationship among the plurality of displays.

The viewpoint information acquisition unit 204 acquires viewpoint information indicating the viewpoint position of the observer that is set in the display system. In other words, the viewpoint information refers to information indicating a three-dimensional position of the viewpoint of the observer when the observer observes the image display unit in the display system. In the present exemplary embodiment, assume that the display image to be displayed on the display system is generated in advance before the observer observes it. However, in the display system illustrated in FIG. 4, a change in a display angle also causes a change in the display image displayed on each of the displays 401 to 403. The display angle varies according to how far the position of the observer is separated from the displays 401 to 403 when observing the displays 401 to 403. Therefore, in the present exemplary embodiment, from which position the observer will observe the displays 401 to 403 should be predicted in advance to generate the display image in advance. In the present exemplary embodiment, the viewpoint position is determined in advance by acquiring a desired viewpoint position for the observer to observe the displays 401 to 403 as the viewpoint information. Further, in the present example, a direction in which the observer observes the displays 401 to 403 is set to be a horizontal direction from the viewpoint position regardless of the viewpoint position. The viewpoint information acquisition unit 204 may be configured to acquire information indicating the position of the viewpoint and information indicating the observation direction from the viewpoint as the viewpoint information.

The imaging parameter acquisition unit 205 acquires an imaging parameter of the imaging apparatus that is set when the input image is acquired by the imaging. The imaging parameter acquisition unit 205 can acquire the imaging parameter based on metadata attached to the input image. Alternatively, the imaging parameter acquisition unit 205 may be configured to acquire the imaging parameter based on information input by the user from the input device 107.

The display image generation unit 206 generates the display image to be displayed on each of the displays 401 to 403 from the one input image based on a positional relationship between the viewpoint position and each of the displays 401 to 403. Details of the display image generation unit 206 will be described below. The image output unit 207 outputs the generated three display images to the respective displays 401 to 403.

In the following description, a flow of processing performed by the image processing apparatus according to the present exemplary embodiment will be described. FIG. 3 is a flowchart illustrating a flow of image processing according to the present exemplary embodiment. The CPU 101 reads out a program for realizing the flowchart illustrated in FIG. 3 that is stored in the ROM 103 or the HDD 105, and executes this program with use of the RAM 102 as the work area therefor. By this execution, the CPU 101 plays a role as each of the functional units illustrated in FIG. 2. In flowcharts that will be described below, "S" will be used to denote each process (step).

In step S301, the image acquisition unit 202 acquires captured image data indicating the captured image stored in the HDD 105 as the input image, and stores it into the RAM 102.

In step S302, the imaging parameter acquisition unit 205 acquires the imaging parameter from the metadata attached to the captured image data. In the present exemplary embodiment, the imaging parameter acquisition unit 205 acquires information for identifying the angle of view of imaging and a projection method of a lens at the time of the imaging as the imaging parameter. In the present exemplary embodiment, the input image is captured via a lens in compliance with the central projection method employed by commonly-used lenses. Further, the imaging parameter acquisition unit 205 also acquires orientation information indicating the orientation of the imaging apparatus when the input image is captured as the imaging parameter. In the present example, the orientation information is acquired via an orientation sensor built in the imaging apparatus. The orientation information is used to acquire an angle that an imaging direction of the imaging apparatus forms together with a ground surface (an elevation angle).

In step S303, the display system information acquisition unit 203 acquires display system information regarding the image display unit in the display system. In the present exemplary embodiment, the display system information acquisition unit 203 acquires information indicating the number of displays on which the image is displayed, the shape of each of the display surfaces, the size, and the layout of these displays. In the present exemplary embodiment, the number of displays is three as illustrated in FIG. 4. The shape of each of the displays 401 to 403 is a flat surface, and a rectangle having a width Wsc and a height Hsc. The three displays 401 to 403 are laid out in such a manner that both an opening angle between the central display 401 and the right display 403 and an opening angle between the central display 401 and the left display 402 are the angle θsc. Further, a visual angle (the display angle) when the display unit formed by the three displays 401 to 403 is observed from the viewpoint position is 2φ. These pieces of display system information are acquired from the input device 107 to the RAM 102 based on an instruction from the user. Alternatively, the image processing apparatus may be configured to store these pieces of information in the HDD 105 as a package of the display system information in advance and select it as necessary from the HDD 105.

In step S304, the viewpoint information acquisition unit 204 acquires the viewpoint information from the input device 107 based on an instruction from the user. In the present exemplary embodiment, the viewpoint information acquisition unit 204 acquires a distance Dview from a central position on the screen of the central display 401 as the viewpoint information.

In step S305, the projection plane setting unit 201 sets the planar projection plane and the cylindrical projection plane to be used when the display images are generated. Details of processing for setting the projection planes will be described below.

In step S306, the display image generation unit 206 generates display image data indicating the display image to be displayed on each of the displays 401 to 403. Details of processing for generating the display images will be described below.

In step S307, the image output unit 207 outputs the generated display image corresponding to each of the displays 401 to 403 from the RAM 102 to the output device 109 via the output I/F 108. Alternatively, the image output unit 207 may output the image so as to store the generated display image into the HDD 105.

Next, the processing for setting the projection planes will be described in detail. In the processing for setting the projection planes, the two projection planes to be used in the processing for generating the display images are set. A first projection plane is the planar projection plane, and a projection plane for disposing the input image in the virtual space. A second projection plane is the cylindrical projection plane, and a projection plane for projecting the input image on the configuration of the display unit. The second projection plane has a role of approximating the input image by the configuration (the shape) of the display unit. The display unit according to the present exemplary embodiment is arranged in such a manner that the three displays 401 to 403 have an angle when being viewed from above. If the display image of each of the displays 401 to 403 is generated by mapping the input image to each of the displays 401 to 403 directly from the planar projection plane, a subject undesirably appears as if being bent around a boundary where the two displays are adjacent to each other when the image is observed from the viewpoint position. This is because a distance of the viewpoint to the subject is unintentionally converted into a distance to the display unit. To solve this problem, in the present exemplary embodiment, the display image of each of the displays 401 to 403 is generated based on an image acquired by projecting the planar projection plane (the first projection plane) on the cylindrical projection plane (the second projection plane). In other words, desirably, the second projection plane is a projection plane having a shape similar to the shape drawn by the three displays 401 to 403 and including no corner when being viewed from above rather than a flat surface. A distance between a point on the cylindrical projection plane and the viewpoint position changes smoothly in the horizontal direction. Mapping the planar projection plane onto the second projection plane set in this manner leads to the display image displayed on the display unit as if the image projected on the cylindrical projection plane is observed from the viewpoint position. As a result, the image processing apparatus can prevent or reduce such a phenomenon that the subject appears as if being bent even around the boundary where the two displays are adjacent to each other. Further, in the processing for setting the projection planes, the cylindrical projection plane is disposed in the virtual space based on the orientation information of the imaging apparatus when the input image is captured.

Figure 5:
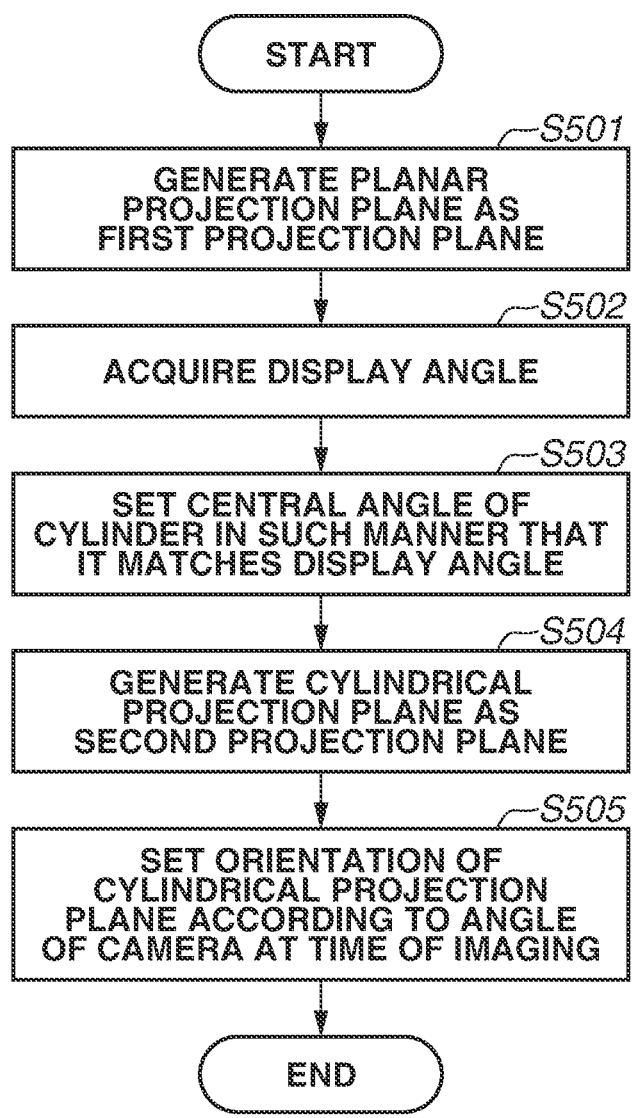
FIG. 5 is a flowchart illustrating processing for setting projection planes.

FIG. 5 is a flowchart illustrating the details of the processing for setting the projection planes that is performed by the projection plane setting unit 201. In the following description, each step in the flowchart will be described.

In step S501, the projection plane setting unit 201 generates the planar projection plane as the first projection plane. The planar projection plane is formed by a rectangular flat surface having the same aspect ratio as the captured image. Further, the projection plane setting unit 201 calculates a size and a position of the planar projection plane in such a manner that the visual angle when the planar projection plane is viewed from the viewpoint position matches the angle of view of imaging, and disposes the planar projection plane in the virtual space.

Figure 7:
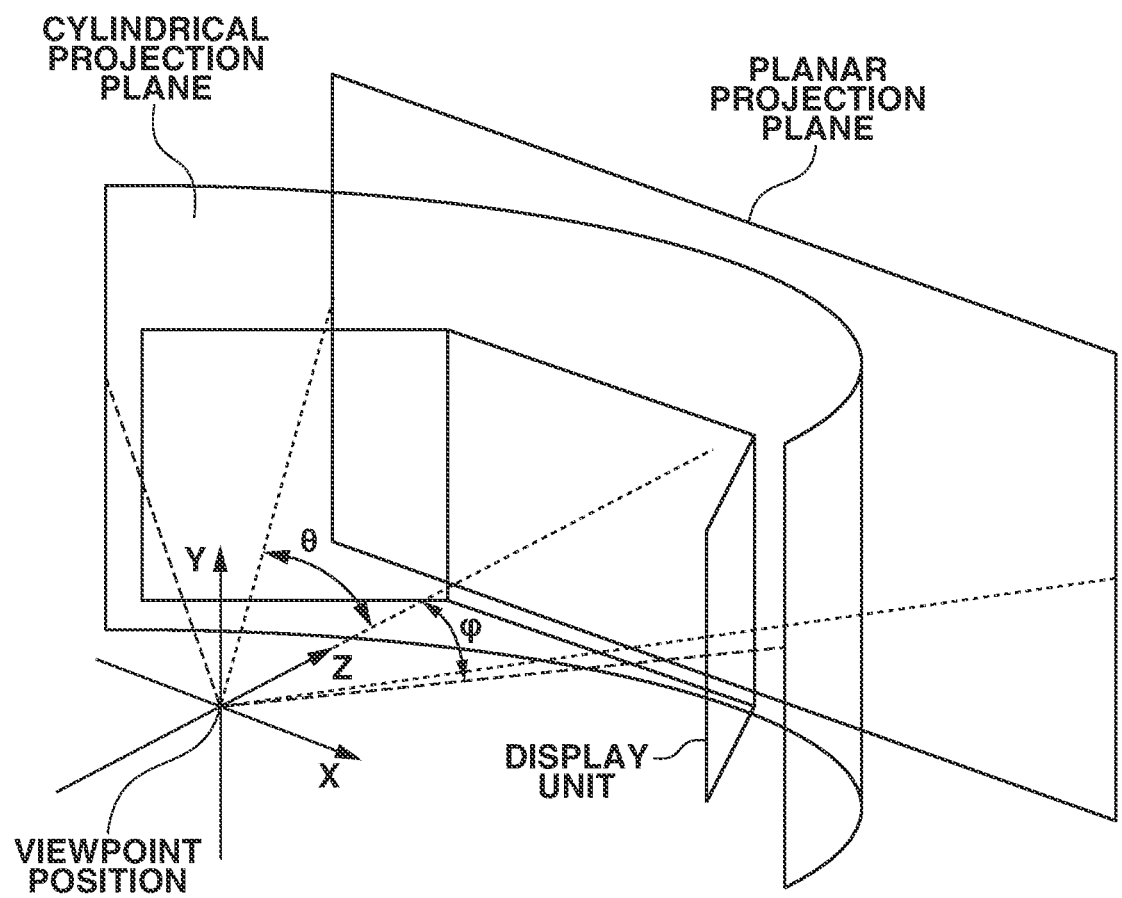
FIG. 7 illustrates a positional relationship among a viewpoint position, a display unit, a planar projection plane, and a cylindrical projection plane.

FIG. 7 illustrates a relationship among the viewpoint position, the display unit, and the virtual projection planes. XYZ three-dimensional coordinates are defined with an origin thereof placed on the viewpoint position in the virtual space. In the virtual space established in this manner, the planar projection plane is disposed at such a position that the planar projection plane extends in parallel with an XY plane and a Z axis passes through a center of the planar projection plane. When the flat surface representing the display unit is disposed in the virtual space, this leads to such a layout of each of the displays 401 to 403 of the display unit that a distance between the origin (the viewpoint position) and the central position of the central display 401 matches Dview. In other words, central coordinates of the central display 401 is (0, 0, Dview). The three displays 401 to 403 are arranged so as to be located horizontally and symmetrically with respect to the Z axis. Now, assuming that θ represents an angle of view half as large as the angle of view of imaging in the horizontal direction in the input image, θ is identified as an angle of view half as large as the visual angle from the viewpoint position with respect to the planar projection plane as illustrated in FIG. 7.

In step S502, the projection plane setting unit 201 acquires the display angle that is the visual angle when the display unit is viewed from the viewpoint position. As illustrated in FIG. 4, in the present exemplary embodiment, the display angle in the horizontal direction is defined to be an angle between a straight line connecting the viewpoint position and a vertically central point of the left end of the left display 402 and a straight line connecting the viewpoint position and a vertically central point of the right end of the right display 403. Assuming that 2φ represents the display angle, an angle φ is an angle half as large as the display angle.

In step S503, the projection plane setting unit 201 sets a central angle of an arc of the cylindrical projection plane based on the display angle 2φ acquired in step S502.

In step S504, the projection plane setting unit 201 generates the cylindrical virtual projection plane as the second projection plane. The cylindrical projection plane is shaped in such a manner that the side surface of the cylinder is cut out along the central angle set in step S503. The projection plane setting unit 201 first disposes the generated cylindrical projection plane in the virtual space in such a manner that a center of the cylinder and the viewpoint position coincide with each other. At this time, a height of the cylindrical projection plane is set in advance such that a ratio between a length and a height of the cylinder matches a ratio between a width and a height of the planar projection plane. In step S504, the cylindrical projection plane is disposed such that a height direction thereof extends in parallel with a Y axis.

Figure 8:
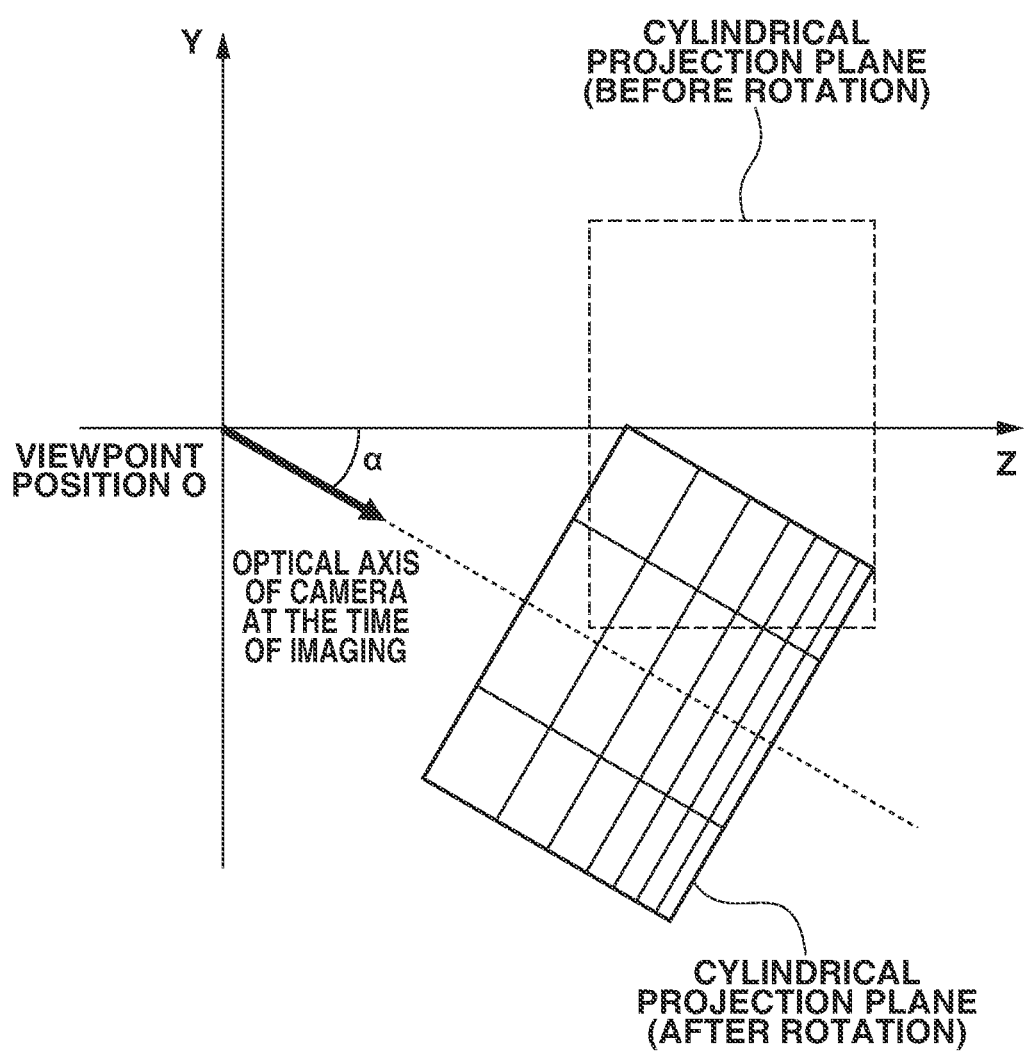
FIG. 8 illustrates a rotation of the cylindrical projection plane.

In step S504, the projection plane setting unit 201 sets an orientation of an elevation angle direction of the cylindrical projection plane according to the orientation of the imaging apparatus (hereinafter also referred to as a camera) at the time of the imaging. FIG. 8 illustrates a relationship between an orientation of an optical axis of the camera at the time of the imaging and the orientation of the cylindrical projection plane. As illustrated in FIG. 8, for example, if the camera is oriented downward by an angle α with respect to the Z axis at the time of the imaging, the cylindrical projection plane is rotated by the angle α around the X axis while being centered at the viewpoint position. As a result, a perpendicular relationship is established between the optical axis of the camera at the time of the imaging and the cylindrical projection plane, and the cylindrical projection plane is disposed so as to be tilted with respect to the XY plane. FIG. 7 illustrates an example when the optical axis of the camera is oriented in a direction in parallel with the Z axis, i.e., when the camera captures the image while being kept horizontal. In this case, the positional relationship is established in such a manner that the Z axis passes through the center of the cylindrical projection plane, and both the planar projection plane and the cylindrical projection plane are disposed so as to extend in parallel with the XY plane.

Now, the processing for generating the display images will be described in detail. The display image generation unit 206 generates the display image corresponding to each of the displays 401 to 403 by rendering the cylindrical projection plane by a virtual camera disposed at the viewpoint position in the virtual space.

FIG. 2B is a block diagram illustrating a detailed configuration of the display image generation unit 206. A first calculation unit 2061 calculates a correspondence relationship between the input image and the planar projection plane. A second calculation unit 2063 calculates a correspondence relationship between the planar projection plane and the cylindrical projection plane. A virtual camera setting unit 2062 sets a virtual camera corresponding to each of the plurality of displays 401 to 403 in the virtual space. In the display system constructed in the present exemplary embodiment, the three displays 401 to 403 are prepared, and therefore three virtual cameras are set. A rendering processing unit 2064 generates the display image by calculating a pixel value of each of pixels in an image that would be formed on the virtual camera with use of the correspondence relationship between the input image and the planar projection plane and the correspondence relationship between the planar projection plane and the cylindrical projection plane with respect to each of the virtual cameras.

Figure 6:
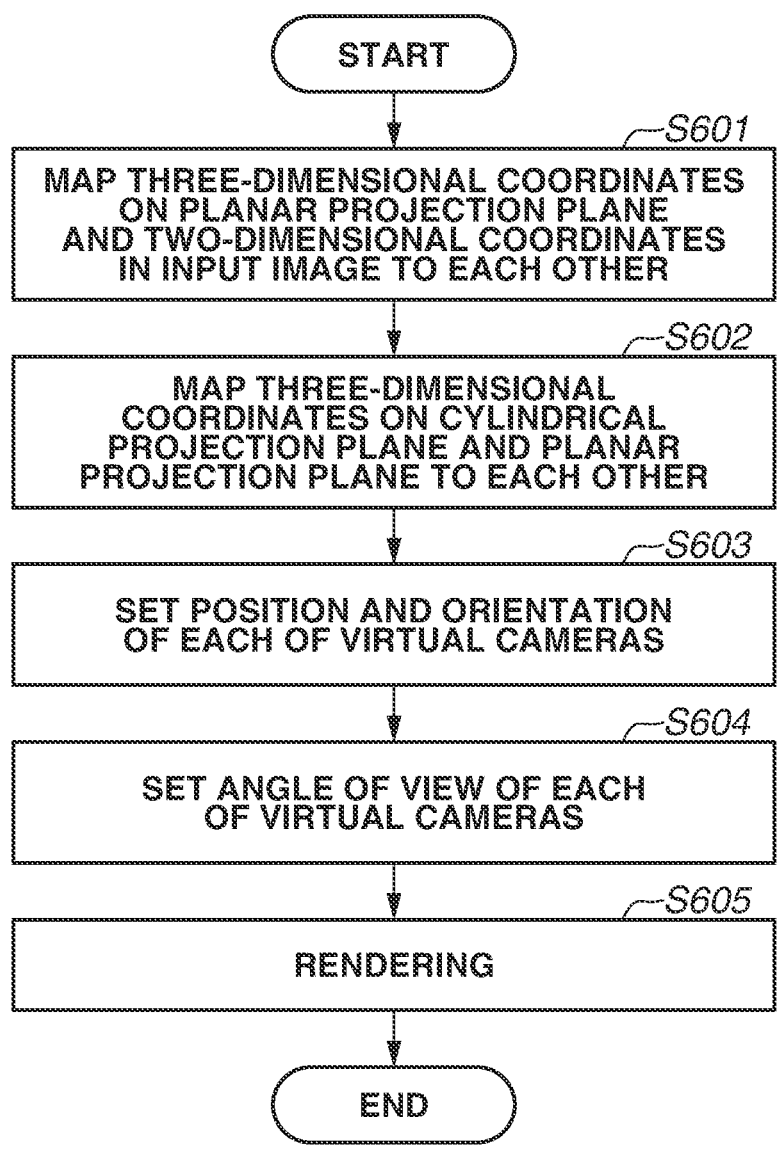
FIG. 6 is a flowchart illustrating processing for generating display images.

FIG. 6 is a flowchart illustrating the details of the processing for generating the display images according to the present exemplary embodiment.

Figure 9:
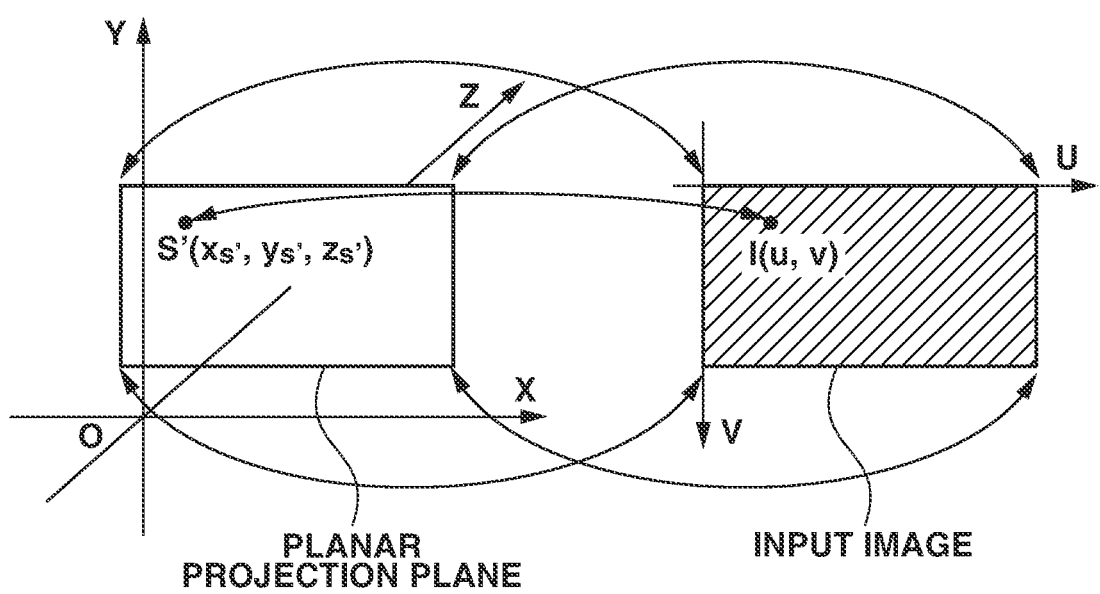
FIG. 9 illustrates a correspondence relationship between the planar projection plane and an input image.

In step S601, the first calculation unit 2061 carries out mapping between three-dimensional coordinates of each vertex of the planar projection plane in the virtual space and two-dimensional coordinates indicating a pixel position in the input image. This is similar processing to UV mapping in commonly-practiced computer graphics (CG) rendering. In the case where the display image generation unit 206 uses the input image captured via the lens for the central projection, the first calculation unit 2061 maps coordinates at four corners of the planar projection plane to coordinates indicating pixel positions at four corners of the input image, respectively, as illustrated in FIG. 9. In the present example, the pixel position of each of the pixels in the input image is expressed by a UV coordinate system having an origin (0, 0) placed at an upper left pixel. The first calculation unit 2061 acquires UV coordinates of each of the vertexes of the input image, and maps them to the three-dimensional coordinates of each of the vertexes of the planar projection plane. The UV coordinates of pixels other than the four corners are calculated from linear interpolation. In a case where the projection method of the lens is the equidistance projection or the equisolid angle projection like a fisheye lens, the intended result may be yielded by performing similar processing after carrying out re-projection according to the central projection.

Figure 10:
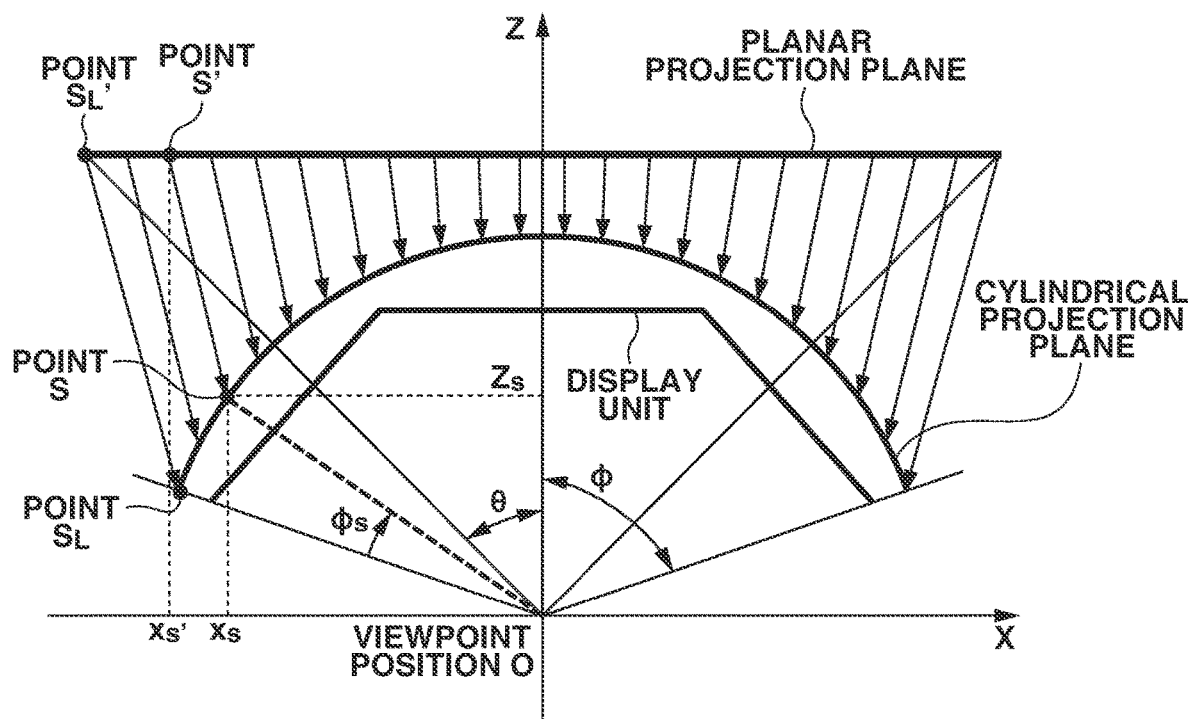
FIG. 10 illustrates a relationship among the display unit, the planar projection plane, and the cylindrical projection plane.

In step S602, the second calculation unit 2063 calculates the correspondence relationship between the cylindrical projection plane and the planar projection plane in the virtual space. FIG. 10 illustrates an XZ plane (Y=0) when FIG. 7 is viewed from above. $W_{flat}$ and $H_{flat}$, represent the width and the height of the planar projection plane, respectively. Assuming that $x_s$ and $z_s$ represent an X coordinate and a Z coordinate at a point S on the cylindrical projection plane, an angle $\varphi_s$ at the point S can be expressed by equations (1) to (3). The angle $\varphi_s$ is defined such that the angle is 0 degrees when the point S is located at a point $S_1$, at a left end of the cylindrical projection plane.

$$\varphi_s = \tan^{-1}\left|\frac{z_s}{x_s}\right| - \left(\frac{\pi}{4} - \varphi\right) \text{ if } x_s < 0 \quad \text{EQUATION (1)}$$

$$\varphi = 2\varphi - \left(\tan^{-1}\left|\frac{z_s}{x_s}\right| - \left(\frac{\pi}{4} - \varphi\right)\right) \text{ else if } x_s > 0 \quad \text{EQUATION (2)}$$

$$\varphi_s = \varphi \text{ else if } x_s = 0 \quad \text{EQUATION (3)}$$

If the point S is located in a third quadrant ($x_s$<0) in the XZ plane, the angle $\varphi_s$ can be calculated by subtracting an angle defined between a line segment connecting the point $S_1$, at the left end of the cylindrical projection plane and the origin and a line segment connecting the X axis and the origin, from an angle defined between a line segment connecting the point S and the origin and the line segment connecting the X axis and the origin. On the other hand, if the point S is located in a first quadrant ($x_s$>0) in the XZ plane, the angle (p, can be calculated by subtracting an angle calculated from the equation (1) from the display angle $2\varphi$. If the point S is located on the Z axis ($x_s$=0), the angle (p, is determined to be $\varphi$, which is a half of the display angle.

Next, an X coordinate $x_s'$ of a point S' on the planar projection plane will be analyzed. The point on the planar projection plane is mapped to the cylindrical projection plane. In the present exemplary embodiment, each of points on the planar projection plane is mapped in such a manner that a corresponding point on the cylindrical projection plane becomes equivalent thereto. At this time, a ratio of the width of the planar projection plane to a length between the point $S_L'$ and the point S' on the planar projection plane, and a ratio of a length of the arc of the cylindrical projection plane to a length of an arc from the point S corresponding to the point S' to the point $S_L$ on the cylindrical projection plane match with each other as indicated by an equation (4).

$$\varphi_s : 2\varphi = \left(\frac{W_{flat}}{2} + x_{s'}\right) : W_{flat} \quad \text{EQUATION (4)}$$

Therefore, the X coordinate $x_s'$ of the point S' is expressed by the angle $\varphi_s$ as indicated by an equation (5).

$$x_{s'} = \frac{\varphi_s W_{flat}}{2\varphi} - \frac{W_{flat}}{2} \quad \text{EQUATION (5)}$$

The second calculation unit 2063 can calculate X a coordinate $x_s'$ of the point S' on the planar projection plane from a X coordinate $x_s$ of the point S on the cylindrical projection plane by substituting the equation (1), the equation (2), or the equation (3) for the angle sp, in the equation (5) according to the position of the $x_s$. In this manner, the second calculation unit 2063 calculates the correspondence relationship that maps the X coordinates on the cylindrical projection plane and the planar projection plane to each other.

Next, mapping of Y coordinates, which is the height direction, will be described. $H_{curve}$ represents the height of the cylindrical projection plane. $y_s$ and $y_s'$ represent a Y coordinate of the point S on the cylindrical projection plane and a Y coordinate of the point S' on the planar projection plane, respectively. Similarly to the calculation in the case of the X coordinate, a ratio of the height of the planar projection plane to a height from a bottom side of the planar projection plane to the point S' on the planar projection plane, and a ratio of the height of the cylindrical projection plane to a height from a bottom side of the cylindrical projection plane to the point S match with each other as indicated by an equation (6).

$$y_{s'} + \frac{H_{flat}}{2} : H_{flat} = y_s + \frac{H_{curve}}{2} : H_{curve} \quad \text{EQUATION (6)}$$

Therefore, the Y coordinate $y_s$ of the point S' is expressed by an equation (7).

$$y_{s'} = H_{flat}\left(\frac{y_s}{H_{curve}} + \frac{1}{2}\right) - \frac{H_{flat}}{2} \quad \text{EQUATION (7)}$$

The second calculation unit 2063 calculates the correspondence relationship that maps the Y coordinates on the cylindrical projection plane and the planar projection plane to each other from the equation (7).

Lastly, the Z coordinate is same at any point on the planar projection plane since the planar projection plane is a flat surface. Therefore, the Z coordinate on the cylindrical projection plane matches with the Z coordinate on the planar projection plane set in the processing for setting the projection planes.

In the present example, the mapping has been described focusing on the mapping of the three-dimensional coordinates of each of the points on the cylindrical projection plane and the planar projection plane when the optical axis of the camera coincides with the Z axis. In a case where the cylindrical projection plane is set while being rotated in the elevation angle direction by the angle α according to the orientation of the optical axis of the camera, the second calculation unit 2063 map the coordinates in consideration of an influence of this rotation. Specifically, the second calculation unit 2063 calculates coordinates ($x_{s2}$, $y_{s2}$, $z_{s2}$) by rotating the coordinates ($x_s$, $y_s$, $z_s$) around the X axis according to this rotational angle α with use of an equation (8). The coordinates are rotated in an opposite direction to a direction when the cylindrical projection plane is set.

$$\begin{bmatrix} x_{s2} \\ y_{s2} \\ z_{s2} \end{bmatrix} = \begin{bmatrix} 1 & 0 & 0 \\ 0 & \cos(-\alpha) & -\sin(-\alpha) \\ 0 & \sin(-\alpha) & \cos(-\alpha) \end{bmatrix} \begin{bmatrix} x_s \\ y_s \\ z_s \end{bmatrix} \quad \text{EQUATION (8)}$$

Then, the three-dimensional coordinates are mapped between the cylindrical projection plane and the planar projection plane with use of $y_{s2}$ instead of $y_s$ in the equations (6) and (7). The X coordinate does not have to be changed because it is not affected by the rotation. Regarding the Z coordinate, the Z coordinate is same at any point on the planar projection plane since the planar projection plane is a flat surface. Therefore, the Z coordinate on the cylindrical projection plane constantly matches with the Z coordinate on the planar projection plane set in the processing for setting the projection planes regardless of whether the cylindrical projection plane is rotated.

Figure 11:
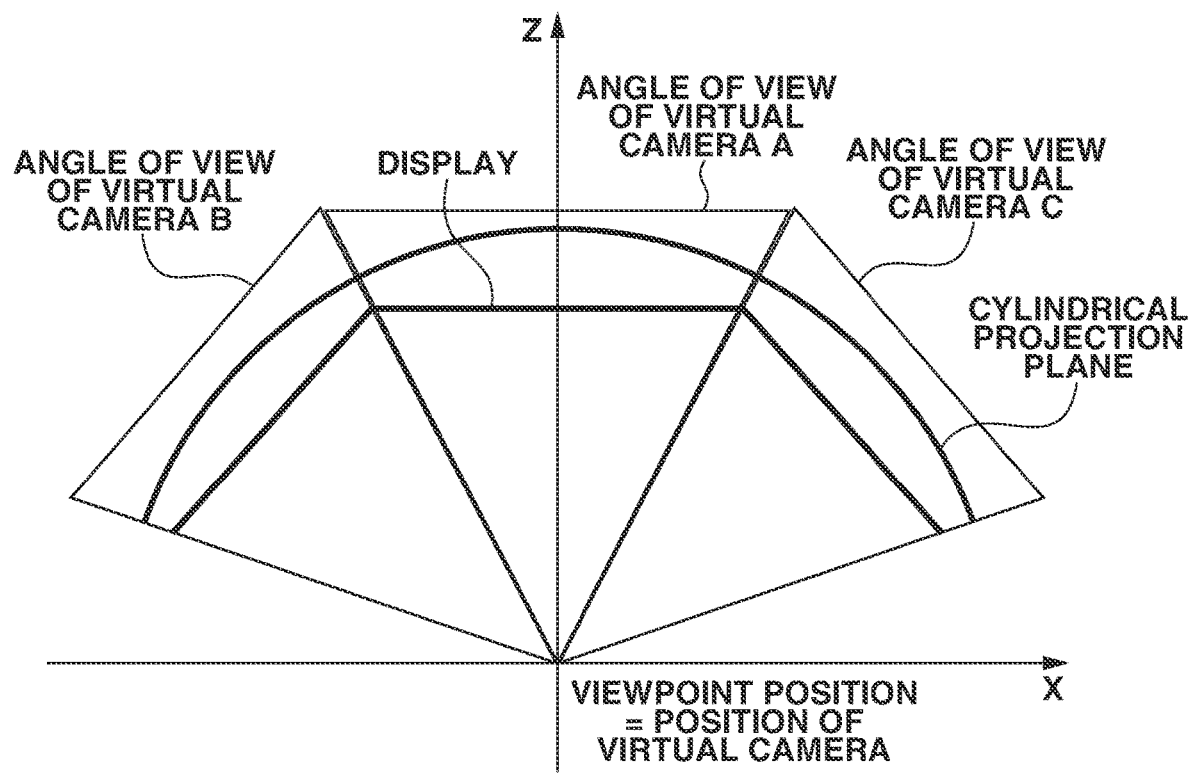
FIG. 11 illustrates a layout of virtual cameras.

In step S603, a virtual camera setting unit 2062 sets a position and an orientation of the virtual camera to be used in processing for rendering the display image. FIG. 11 illustrates the position and the orientation of the virtual camera according to the present exemplary embodiment. The virtual camera setting unit 2062 prepares three virtual cameras in total corresponding to the individual displays 401 to 403. Specifically, the virtual camera setting unit 2062 sets a virtual camera A for the central display 401, a virtual camera B for the left display 402, and a virtual camera C for the right display 403 in the virtual space. The position of each of the virtual cameras A to C is set at the viewpoint position, i.e., the center of the cylindrical projection plane. The orientation of the virtual camera is set in such a manner that an optical axis of the virtual camera is oriented toward the center of the display corresponding to each of the virtual cameras A to C.

In step S604, the virtual camera setting unit 2062 sets an angle of view of the virtual camera. The virtual camera setting unit 2062 sets the visual angle when the display corresponding to each of the virtual cameras A to C is viewed from the viewpoint position, as the angle of view of each of the virtual cameras A to C.

In step S605, the rendering processing unit 2064 performs the rendering processing with respect to each of the three virtual cameras A to C, thereby generating the display image data indicating the display image. Specifically, first, the rendering processing unit 2064 calculates three-dimensional coordinates on the cylindrical projection plane that are projected on each pixel in an image that is acquired when the virtual camera captures an image in the virtual space. Next, the rendering processing unit 2064 converts the three-dimensional coordinates on the cylindrical projection plane into three-dimensional coordinates on the planar projection plane based on the correspondence relationship between the planar projection plane and the cylindrical projection plane that has been calculated in step S602. Further, the rendering processing unit 2064 converts the three-dimensional coordinates on the planar projection plane into a position on the input image based on the correspondence relationship between the planar projection plane and the input image that has been calculated in step S601. By these operations, the pixels in the image that are acquired by the virtual camera are mapped to the positions on the input image.

The rendering processing unit 2064 calculates a pixel value of the pixel in the image that is acquired by the virtual camera, by carrying out sampling based on the calculated position on the input image. Specifically, the rendering processing unit 2064 acquires pixel values of four pixels surrounding the calculated position on the input image. The rendering processing unit 2064 determines the pixel value of the pixel on the image that is acquired by the virtual camera, by carrying out an interpolation calculation according to the calculated position with respect to the pixel values of the four pixels acquired from the input image. The display image to be produced on each of the displays 401 to 403 is generated by performing this processing on all of the pixels of each of the virtual cameras A to C.

Thus, in the present exemplary embodiment, the image processing apparatus generates the display images to be produced on the three display screens (the displays 401 to 403) based on the one input image. Therefore, the image processing apparatus can realize such a display system that, when the respective display images are generated among the plurality of display screens, each of the display screens is naturally connected to one another and the observer can feel as if he/she is actually present in this scene. Further, the image processing apparatus generates the display images from the input image with use of the two projection planes, i.e., the planar projection plane and the cylindrical projection plane. First, this method allows the planar projection plane in the virtual space to be mapped to the cylindrical projection plane as if being expanded according to the display angle, thereby allowing the image processing apparatus to generate the display images for displaying the image containing the wide field of view for the observer. Especially, when the image containing the wide field of view is displayed on the display unit arranged so as to cover the observer's field of view with the plurality of planar displays, the image processing apparatus can provide, on the display unit, the natural display image that does not make the observer feel as if the subject is bent around the boundary where the displays are adjacent to each other.

Further, in the present exemplary embodiment, the orientation of the cylindrical projection plane, which plays the role of approximating the input image by the configuration of the display unit, is set according to the camera orientation. For example, in a sport stadium or the like, capturing the image by the camera as if looking down on the scene from above may be more desirable because this method can image the entire scene. At this time, the camera is oriented downward, which means that the image is captured from a direction different from the observation direction assumed to be set in the display system. If the display image is generated by projecting the input image captured in this manner, a positional relationship between the projection plane of the camera and the subject is maintained as a positional relationship between the viewpoint position relative to the display unit and the subject in the display image produced on the display unit. As a result thereof, the image may be undesirably generated so as to make the observer feel unnatural when the observer observes the display system. Especially, a surface evidently supposed to be horizontal, like a ground surface on the sport stadium, incorrectly looks like a tilted slope on the display system, and/or a subject supposed to stand upright incorrectly looks like leaning forward.

Therefore, in the present exemplary embodiment, the cylindrical projection plane of the two projection planes is disposed in the virtual space in the orientation according to the camera orientation of the input image. FIGS. 12A to 12C illustrate the input image and the display image according to the present exemplary embodiment. FIG. 12A illustrates a region in the input image that corresponds to the display image of the central display 401. A region 1202 is a region rendered as the display image when the planar projection plane and the cylindrical projection plane are arranged in parallel with each other. FIG. 12B illustrates a display image 1204 generated based on the region 1202. On the other hand, if the rendering processing is performed while only the cylindrical projection plane is tilted as illustrated in FIG. 8, this causes a region 1203 to correspond to the display image. FIG. 12C illustrates a display image 1206 acquired as a result of performing the rendering processing while tilting only the cylindrical projection plane as illustrated in FIG. 8. A subject 1207 in the display image 1206 is located on a lower side and has a shorter vertical height compared to a subject 1205 in the display image 1204. Further, a distance above the subject 1207 is felt to be longer than a distance above the subject 1205 when being viewed from the observer. In other words, the display image 1206 is generated such that a horizontal width of the subject increases from a top portion toward a bottom portion of the display image. At this time, according to the present exemplary embodiment, the horizontal width increases as the position of the subject is located lower in the image. For example, if the subject is square on the display image generated without the cylindrical projection plane tilted, the subject becomes trapezoidal on the display image generated with the cylindrical projection plane tilted. If the subject is square, the height of the trapezoid reduces, and an upper base and a lower base thereof further reduces and increases, respectively, as the cylindrical projection plane is tilted by a greater angle when the display image is generated.

In this manner, the natural display image free from the unnaturalness can be generated by using the two projection planes and tilting any one of the projection planes based on the camera orientation when the input image is captured, in a case where the display image to be produced on the display unit is generated from the input image.

In the present exemplary embodiment, the image processing apparatus has been described referring to the software that realizes each of the units illustrated in FIG. 2 by the CPU 101 executing the program by way of example. However, a part or all of the individual units illustrated in FIG. 2 can also be realized by a dedicated processing circuit.

In the first exemplary embodiment, the image processing apparatus uses the two projection planes, i.e., the planar projection plane and the cylindrical projection plane, and sets the orientation of the cylindrical projection plane according to the camera orientation at the time of the imaging. On the other hand, a second exemplary embodiment will be described as an example in which the user adjusts the orientation of the cylindrical projection plane. For example, if there is an error in the camera orientation at the time of the imaging, the unnaturalness may undesirably remain in the display image even when the orientation of the cylindrical projection plane is controlled according to the camera orientation. Alternatively, the unnaturalness also undesirably remains in the display image when horizontality is not realized for the subject desired to appear horizontal in the first place. Therefore, the present exemplary embodiment will be described as a method for allowing the user to further adjust the orientation of the cylindrical projection plane set according to the camera orientation at the time of the imaging.

In the first exemplary embodiment, the display system including the display unit illustrated in FIG. 4 is connected as the output device 109. In the present exemplary embodiment, a commonly-used personal computer (PC) display is further connected. The user can adjust the orientation of the cylindrical projection plane by operating a graphical user interface (GUI) displayed on this PC display.

Figure 13:
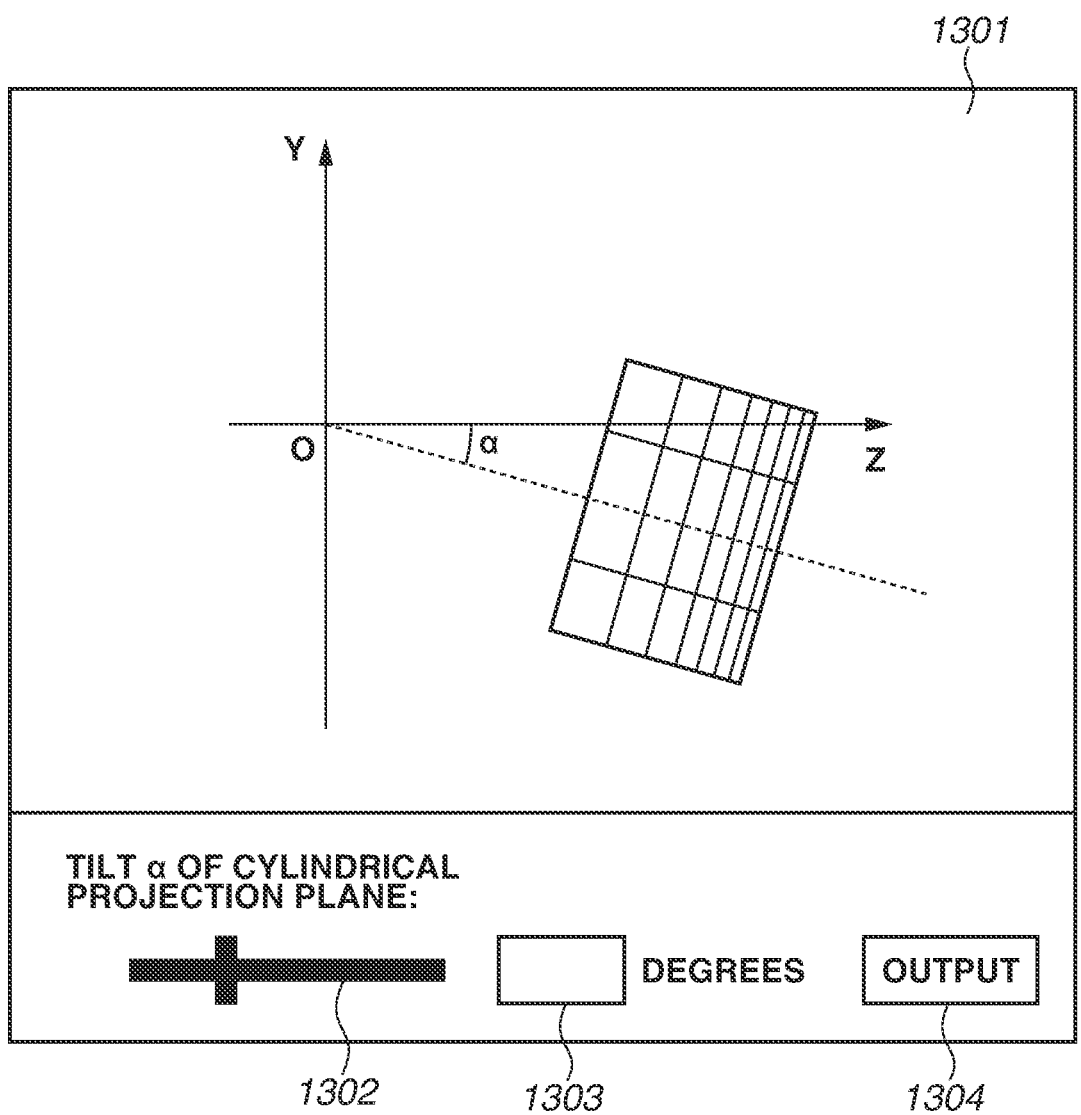
FIG. 13 illustrates a graphical user interface (GUI) for adjusting an orientation of the cylindrical projection plane.

FIG. 13 illustrates the GUI usable for the user to adjust the orientation of the cylindrical projection plane. The CPU 101 causes the GUI illustrated in FIG. 13 to be displayed on the PC display. The user can adjust the tilt of the cylindrical projection plane by operating a slider 1302 leftward or rightward on the GUI illustrated in FIG. 13. The projection plane setting unit 201 receives information indicating a tilt α of the cylindrical projection plane according to a position of the slider 1302 adjusted by the user. Further, the projection plane setting unit 201 causes a value of the tilt α of the projection plane to be displayed in a text box 1303 according to the position of the slider 1302. Alternatively, the user can also directly input the value to the text box 1303. In this case, the projection plane setting unit 201 inputs the input value to the projection plane setting unit 201 as the tilt α of the cylindrical projection plane. An initial value at the slider 1302 and in the text box 1303 is set to the tilt α of the cylindrical projection plane that is set based on the camera orientation at the time of the imaging. Further, the image processing apparatus may be configured such that a reset button is disposed to allow the user to cancel the adjustment, and the setting at the slider 1302 and in the text box 1303 returns to the initial value when the user presses this reset button.

In FIG. 13, an image in which the cylindrical projection plane is set up on the YZ plane in the virtual space is displayed as an initial screen in a preview region 1301. When the user adjusts the tilt α of the cylindrical projection plane via the slider 1302 or the text box 1303, a result thereof is graphically displayed in the preview region 1301, and the user can visually confirm how much the cylindrical projection plane is tilted. FIG. 13 illustrates the example of the two-dimensional display indicating the YZ plane, but the image processing apparatus may be configured to present a three-dimensional display in the preview region 1301 by allowing the user to change the viewpoint position through, for example, a mouse operation. Alternatively, the image processing apparatus may be configured to display the generated display image in the preview region 1301 instead of the cylindrical projection plane.

Further, when the user presses an output button 1304, the display image generated with use of the tilt α of the cylindrical projection plane set by the user via the GUI is output.

Figure 14:
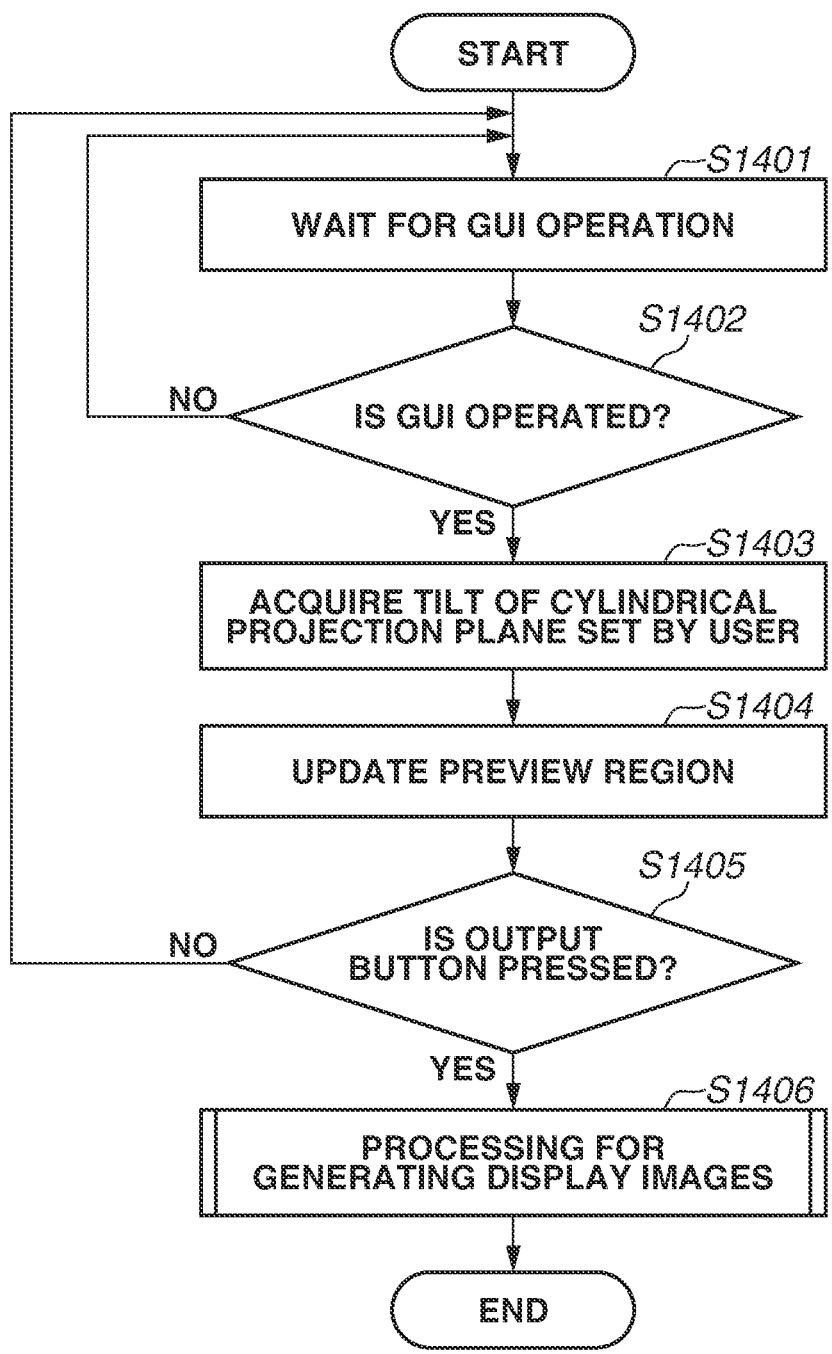
FIG. 14 is a flowchart of processing for adjusting the orientation of the cylindrical projection plane.

Next, processing for adjusting the orientation of the cylindrical projection plane according to the GUI operation will be described with reference to a flowchart illustrated in FIG. 14.

The projection plane setting unit 201 waits for the GUI operation to be performed by the user. In step S1402, the projection plane setting unit 201 determines whether the GUI operation has been performed by the user. Specifically, the projection plane setting unit 201 determines whether the slider 1302 or the text box 1303 is operated. If the slider 1302 or the text box 1303 is operated (YES in step S1402), the processing proceeds to step S1403. If not (NO in step S1402), the processing returns to step S1401, in which the projection plane setting unit 201 waits for the GUI operation.

In step S1403, the projection plane setting unit 201 acquires the tilt α of the cylindrical projection plane set by the user via the GUI by acquiring the value at the slider 1302 and in the text box 1303.

In step S1404, the projection plane setting unit 201 updates the display in the preview region 1301 based on the tilt α of the cylindrical projection plane acquired in step S1403. This update allows the user to visually confirm how much the projection plane is tilted.

In step S1405, the projection plane setting unit 201 determines whether the output button 1304 is pressed by the user. If the output button 1304 is pressed (YES in step S1405), the processing proceeds to step S1406. If not (NO in step S1405), the processing returns to step S1401, in which the projection plane setting unit 201 waits for the GUI operation.

In step S1406, the display image generation unit 206 generates the display image data indicating the display image to be produced on each of the displays 401 to 403 with use of the tilt α of the cylindrical projection plane that has been acquired in step S1403 instead of the tilt of the cylindrical projection plane set based on the camera orientation at the time of the imaging. Details of the processing are similar to the flowchart illustrated in FIG. 6 according to the first exemplary embodiment, and therefore a description thereof will be omitted here.

Thus, the present exemplary embodiment has been described as the example in which the user adjusts the orientation of the cylindrical projection plane via the GUI. This configuration allows the display image to be generated without causing little strangeness by finely adjusting the orientation of the cylindrical projection plane when there is an error in the camera orientation at the time of the imaging or when horizontality is not achieved for the subject desired to appear horizontal in the first place.

An exemplary modification will be described. In the above-described exemplary embodiments, the display image is generated after the processing for setting the projection planes including the processing for setting the orientation of the cylindrical projection plane is performed. Such processing for setting the projection planes is required when the display image to be produced on the display system which is assumed in the first exemplary embodiment is generated for the first time. However, for example, the processing for generating the projection planes is not necessarily required in a case where the display system and the imaging apparatus are set up in a fixed manner. For example, suppose that the user can adjust the tilt α of the projection plane and generate the desired display image according to the above-described exemplary embodiment. Information indicating the virtual space in which the projection plane is adjusted by the user is stored in the ROM 103 or the HDD 105 in advance. Further, the information indicating the correspondence relationship between the input image and the planar projection plane that has been calculated in step S601, and the information indicating the correspondence relationship between the planar projection plane and the cylindrical projection plane that has been calculated in step S602 when the display image has been generated, are also stored in advance in a similar manner.

After that, the virtual space set by the processing for setting the projection planes when the display image has been generated previously, may be used. In this case, the processing illustrated in FIG. 5 is not required, and the display image can be generated by causing the processing to proceed to step S306 subsequently to step S304. Further, each of steps S601 and S602 can be fulfilled by performing processing for reading out the stored information indicating the correspondence relationship between the input image and the planar projection plane, and the stored information indicating the correspondence relationship between the planar projection plane and the cylindrical projection plane, instead of the calculation processing. The correspondence relationship between the planar projection plane and the cylindrical projection plane is naturally relationship calculated when the cylindrical projection plane has been set while being tilted by the desired angle, so that this processing leads to generation of the display image without providing little strangeness. As a result, the display image can be more easily generated unless a considerable change occurs in the display configuration of the display system and the imaging direction of the imaging apparatus.

Further, if the instruction to adjust the tilt α of the cylindrical projection plane is input from the user again when the display image is generated with use of the information calculated and stored when the display image has been previously generated, this instruction can be reflected by reading out the pre-stored information indicating the virtual space and making the adjustment. In the read virtual space, the planar projection plane according to the angle of view of imaging and the viewpoint information, and the cylindrical projection plane set while being tilted so as to achieve the desired display image are disposed.

In the above-described exemplary embodiments, the image processing apparatus has been described referring to the example in which the orientation information of the imaging apparatus is acquired from the orientation sensor. Instead, the orientation information of the imaging apparatus may be estimated from the input image. Examples employable therefor include such a known method that the position and the orientation of the imaging apparatus are estimated by mapping a natural feature point (a landmark) located at a known three-dimensional position in a real space and a natural feature point in the input image, to each other. Alternatively, in a case where the imaging apparatus images such a scene that a precise circle is drawn on the ground surface, the orientation of the imaging apparatus relative to the ground surface can also be estimated by detecting what kind of ellipse this precise circle is deformed into.

In the above-described exemplary embodiments, the orientation of the cylindrical projection plane is controlled according to the camera orientation at the time of the imaging with use of the two projection planes, i.e., the planar projection plane and the cylindrical projection plane. However, for example, only the planar projection plane may be employed as the projection plane to be used to render the input image. In this case, a similar effect can be acquired by controlling the orientation of the planar projection plane according to the camera orientation at the time of the imaging. At this time, the intended result can be yielded by omitting the mapping of the three-dimensional coordinates of each point between the cylindrical projection plane and the planar projection plane that is carried out in step S602 illustrated in FIG. 6, and by calculating the pixel position in the input image directly from the three-dimensional coordinates on the planar projection plane.

The display angle indicating the angle over which the observer views the display unit from the viewpoint position according to the present exemplary embodiments can also be regarded as a range in the input image that is used for the display.

Further, in the above-described exemplary embodiments, the projection plane referred to as the cylindrical projection plane is set as the second projection plane. The cylindrical projection plane is a developable surface defined by curving the flat surface horizontally with respect to the viewpoint as illustrated in FIG. 7. Desirably, the second projection plane is a surface having an intermediate shape between the input image, which is the flat surface with respect to the viewpoint, and the display unit.

Further, in the above-described exemplary embodiments, the image processing apparatus has been described assuming that the display unit is formed by the three displays 401 to 403 in the display system that produces the display image, by way of example. A screen on which an image is projected by a projector may also be used as the display unit other than the self-luminance display. As the display system in this case, a plurality of projectors respectively corresponding to the plurality of screens is set up so as to project the display image on each of the screens. Further, the above-described exemplary embodiments can also be applied to a display system in which a plurality of projectors projects images on a white wall. If the wall on which the images are projected is shaped similar to the displays 401 to 403 illustrated in FIG. 4 when being viewed from above, a similar effect can be acquired by generating the display images with use of the cylindrical projection plane. In this case, the display system information is acquired regarding a region on which the images are projected on the white wall as the display unit.

Further, the image processing apparatus has been described referring to the example in which the one common cylindrical projection plane is used for the central display 401, the left display 402, and the right display 403. Due to this configuration, the display images capable of presenting the display free from the strangeness can be generated even among the different displays 401 to 403. However, this configuration may be modified in such a manner that, for example, projection planes having different curved surfaces are set for the surfaces of the three displays, respectively. In this case, desirably, the three cylindrical projection planes are configured to smoothly connect to one another.

Further, in the above-described exemplary embodiments, the display system has been described referring to the display unit using the large-sized display for the observer as illustrated in FIG. 4, by way of example. However, a similar display system can be constructed even with, for example, the display unit having only an enough size to cover merely a head portion with use of a plurality of planar display screens. One example thereof is a head mounted display. Even in this case, the image containing the wide field of view that provides the realistic sensation can also be displayed by employing the display screens having the flat surfaces constituting the display unit and arranging them in such a manner that the normal line to each of the display screens has the intersection point among them on the image display side. Even for such a display system, the display image of each display screen is generated from common one input image similar to the above-described exemplary embodiments. Further, the image containing the wide field of view that is free from the strangeness can be generated by carrying out the rendering with use of the cylindrical projection plane in addition to the planar projection plane on which the input image is projected in the virtual space.

Further, the viewpoint information in the above-described exemplary embodiments is identified by designating the desired position of the observer. However, for example, the viewpoint information may be determined by actually detecting the position of the observer and setting the viewpoint information according to the observer actually observing the display system.

The present disclosure can also be realized by processing that supplies a program capable of fulfilling one or more functions of the above-described exemplary embodiments to a system or an apparatus via a network or a storage medium, and causes one or more processors in a computer of this system or apparatus to read out and execute the program. Further, the present disclosure can also be realized by a circuit (for example, an application specific integrated circuit (ASIC)) capable of fulfilling one or more functions.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2018-028178, filed Feb. 20, 2018, and No. 2018-237897, filed Dec. 20, 2018, which are hereby incorporated by reference herein in their entirety.

What is claimed is:

1. An image processing apparatus configured to generate a display image to be produced on a display system including a display unit, the image processing apparatus comprising:
   an acquisition unit configured to acquire information regarding an imaging direction of an imaging apparatus when the imaging apparatus captures an input image; and
   a generation unit configured to generate the display image to be produced on the display unit with use of a relationship between the input image and a projection plane in a virtual space according to the information regarding the imaging direction.

2. The image processing apparatus according to claim 1, wherein the projection plane set in an orientation according to a tilt of an elevation angle direction of the imaging apparatus is mapped to the input image in the virtual space.

3. The image processing apparatus according to claim 1, further comprising a setting unit configured to set the projection plane in the virtual space based on the information regarding the imaging direction of the imaging apparatus,
   wherein the generation unit calculates the relationship between the input image and the projection plane with use of the projection plane set by the setting unit.

4. The image processing apparatus according to claim 3, wherein the setting unit controls an orientation of the projection plane in the virtual space based on orientation information.

5. The image processing apparatus according to claim 3, wherein the setting unit sets an orientation of the projection plane in such a manner that it extends perpendicularly to an optical axis of the imaging apparatus.

6. The image processing apparatus according to claim 3, wherein the setting unit arranges the projection plane in the virtual space in such a manner that the projection plane is oriented upward with respect to a viewpoint position for generating the display image in the virtual space, if a downward orientation of the imaging apparatus is indicated.

7. The image processing apparatus according to claim 3, wherein the display unit is configured in such a manner that a plurality of planar display screens capable of displaying an image thereon is arranged,
   wherein the setting unit sets a planar first projection plane corresponding to the input image and a second projection plane formed by a curved surface and different from the first projection plane as the projection plane, and
   wherein the setting unit arranges the first projection plane and the second projection plane in the virtual space such that only the second projection plane is oriented according to orientation information.

8. The image processing apparatus according to claim 3, wherein the setting unit further receives an instruction for adjusting a tilt of the projection plane from a user and adjusts the tilt of the projection plane according to the instruction.

9. The image processing apparatus according to claim 3, wherein the setting unit further acquires viewpoint information regarding a viewpoint in the display system, and
   wherein the setting unit sets a position of the viewpoint indicated by the viewpoint information as an origin in the virtual space, and sets the projection plane such that an axis indicating a direction of the viewpoint indicated by the viewpoint information in the virtual space passes through a center of the projection plane, and the projection plane covers the position of the viewpoint.

10. The image processing apparatus according to claim 9, wherein the setting unit sets the projection plane by rotating a straight line passing through the origin and the center of the projection plane by an amount corresponding to an angle indicating the imaging direction.

11. The image processing apparatus according to claim 1, wherein the acquisition unit acquires orientation information of the imaging apparatus from the imaging apparatus as the information regarding the imaging direction of the imaging apparatus.

12. The image processing apparatus according to claim 1, wherein the generation unit generates the display image by converting the image captured by the imaging apparatus such that a vertical height reduces, and a horizontal width increases as a position in the image becomes lower.

13. The image processing apparatus according to claim 1, wherein a line-of-sight direction of an observer and the imaging direction assumed in the display system are different from each other in an elevation angle direction.

14. The image processing apparatus according to claim 1, wherein the relationship between the input image and the projection plane is a correspondence relationship between a position on the projection plane and a position in the input image.

15. The image processing apparatus according to claim 1, further comprising a holding unit configured to hold the information indicating the relationship between the input image and the projection plane,
   wherein the generation unit reads out the information indicating the relationship between the input image and the projection plane from the holding unit.

16. An image processing apparatus configured to generate a display image to be produced on a display system including a display unit, the display unit being configured such that a plurality of planar display screens capable of displaying an image thereon is arranged, the image processing apparatus comprising:
   a generation unit configured to generate a plurality of display images to be produced on the plurality of display screens, respectively, with use of a correspondence relationship among an input image, a first projection plane, and a second projection plane in a virtual space in which the planar first projection plane corresponding to the input image and the second projection plane formed by a curved surface and different from the first projection plane are set, the correspondence relationship being established in such a manner that the first projection plane is disposed in parallel with an XY plane and the second projection plane is disposed so as to be tilted with respect to the XY plane in the virtual space.

17. An image processing method for generating a display image to be produced on a display system including a display unit, the image processing method comprising:
   acquiring information regarding an imaging direction of an imaging apparatus when the imaging apparatus captures an input image; and
   generating the display image to be produced on the display unit with use of a relationship between the input image and a projection plane in a virtual space according to the information regarding the imaging direction.

18. An image processing method for generating a display image to be produced on a display system including a display unit, the display unit being configured such that a plurality of planar display screens capable of displaying an image thereon is arranged, the image processing method comprising:
   generating a plurality of display images to be produced on the plurality of planar screens, respectively, with use of a correspondence relationship among a planar first projection plane disposed in parallel with an XY plane in a virtual space and corresponding to an input image, a second projection plane different from the first projection plane that is disposed so as to be tilted with respect to the XY plane in the virtual space and formed by a curved surface, and the input image.

19. A non-transitory computer-readable storage medium storing a computer program for causing a computer to execute an image processing method for generating a display image to be produced on a display system including a display unit, the method comprising:
   acquiring information regarding an imaging direction of an imaging apparatus when the imaging apparatus captures an input image; and
   generating the display image to be produced on the display unit with use of a relationship between the input image and a projection plane in a virtual space according to the information regarding the imaging direction.

20. A non-transitory computer-readable storage medium storing a computer program for causing a computer to execute an image processing method for generating a display image to be produced on a display system including a display unit, the display unit being configured such that a plurality of planar display screens capable of displaying an image thereon is arranged, the method comprising:
   generating a plurality of display images to be displayed on the plurality of planar screens, respectively, with use of a correspondence relationship among a planar first projection plane disposed in parallel with an XY plane in a virtual space and corresponding to an input image, a second projection plane different from the first projection plane that is disposed so as to be tilted with respect to the XY plane in the virtual space and formed by a curved surface, and the input image.

* * * * *